TAPE PUNCH COMPUTER APPARATUS

Filed May 22, 1967 2 Sheets-Sheet 1

INVENTOR.
ROBERT E. SAYLES
BY
Townsend and Townsend
ATTORNEYS

Jan. 27, 1970 R. E. SAYLES 3,491,940

TAPE PUNCH COMPUTER APPARATUS

Filed May 22, 1967 2 Sheets-Sheet 2

INVENTOR.
ROBERT E. SAYLES
BY
Townsend and Townsend
ATTORNEYS 3,491,940
TAPE PUNCH COMPUTER APPARATUS
Robert E. Sayles, 1481 Sturgeon Way, San Jose, Calif. 85129
Filed May 22, 1967, Ser. No. 640,236
Int. Cl. G06k *1/10*
U.S. Cl. 234—108 16 Claims

ABSTRACT OF THE DISCLOSURE

Tape punch apparatus suitable for office and field use for making computations and recording information on a perforable tape which is intermittently advanced through a punch block assembly and selectively punched by punch pins mounted in the punch block of the assembly transversely of the path of the tape therethrough. Electrical power devices for shifting the pins are arranged about the punch block, and electrical switches and a portable electrical power source are provided for selectively actuating the power devices.

This invention relates to improvements in tape punch machines and, more particularly, to tape punching computer apparatus which can be made sufficiently small and lightweight to adapt it for field use as well as for office use.

The present invention is directed to an improved tape punch computer apparatus wherein a novel punch block assembly is coupled to a support which includes a punch block having a number of punch pins selectively movable into and through a tape passage in the punch block so that a perforable tape in the passage can be selectively punched at positions thereon determined by the positions of the pins. Thus, the holes and their relative positions in the tape will represent numerical or other information in a predetermined numbering or code system, such as the binary system. After the tape has been punched to provide the necessary computations or information thereon, it can then be used in any number of ways, such as for providing the input for a computer network.

Since numerical and other information can be readily stored in the form of punched holes in a perforable tape, a portable tape punch apparatus would be a desirable and oftentimes necessary tool for engineers and other technical personnel conducting field tests in various technologies. Using such apparatus would eliminate having to record data in long-hand where errors can arise due to illegibility or erasures. In using tape punch apparatus, data can be recorded in the form of punched holes so that the tape will not only form a permanent record capable of being stored but also can be sent to a central control station to be used as the input for a much larger and more permanent type of a memory storage system, such as a computer network.

Generally, tape punch machines are much too large and bulky to carry into the field for data recording purposes. Thus, it has been impractical in the past to use tape punching techniques for field use or for other use which requires the apparatus to be moved from place to place.

The present invention circumvents this problem by providing a tape punch apparatus which is relatively small and lightweight in construction so that it can be hand carried and operated in a portable manner in field work or in other operations requiring that the apparatus be moved to different operating locations. To this end, the invention utilizes the aforementioned novel punch block assembly wherein the individual, lightweight power devices for shifting the punch pins of the assembly are arranged in a compact manner about the punch pins to minimize the size and thereby the space requirements of the assembly apparatus as well as to keep the weight of the assembly at a minimum. To accomplish this end, the power devices are clustered about the assembly and staggered relative to each other to utilize the available space closely adjacent to and about the punch block. In this way, the overall apparatus can be of minimum size and weight and the power devices for moving the punch pins can be of a type which is operable from a portable power source.

The primary object of this invention is, therefore, to provide an improved tape punch apparatus for recording numerical and other data on a perforable tape wherein the apparatus is simple and rugged in construction, can be easily moved from place to place, and can be operated by a portable power source so that the apparatus is suitable for field work or for other uses requiring that data be recorded at a number of different locations.

A further object of this invention is to provide a novel punch block assembly for tape punch apparatus of the type described wherein a number of shiftable punch pins have respective low-power, actuating devices disposed in a compact arrangement about the punch block itself to minimize the space requirements of the assembly and to allow the use of a portable electrical power source for operating the apparatus.

Other objects of this invention will become apparent as the following specification progresses, reference being had to the accompanying drawings for an illustration of a preferred embodiment.

Figure 1:
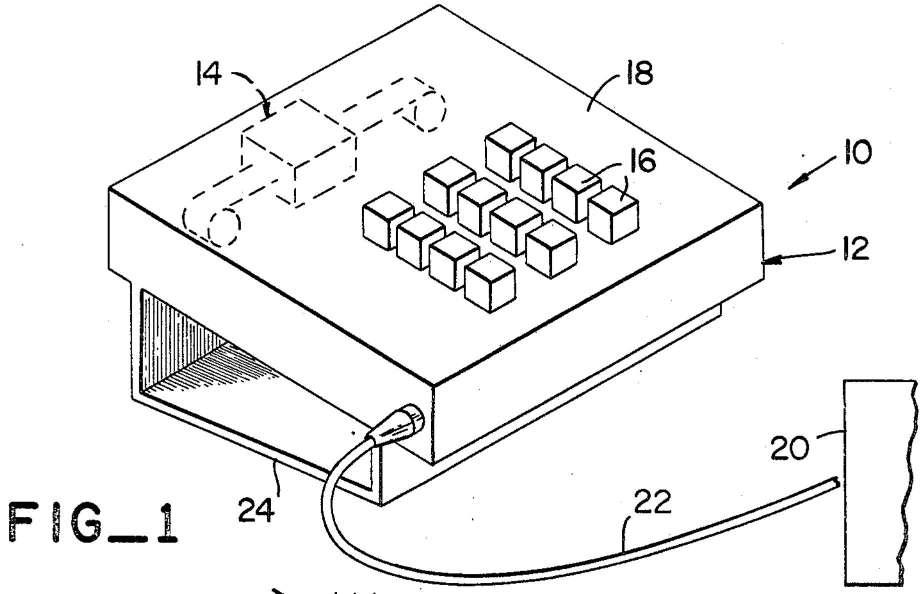
FIG. 1 is a perspective view of the tape punch apparatus of this invention.

Tape punch apparatus 10 includes a housing 12 which defines a support for a punch block assembly 14 mounted within the housing adjacent to a number of electrical push button switches each provided with a push button actuator 16 which extends outwardly from the normally upper face 18 of the housing. The actuators are manually forced into the housing to actuate the switch and have a spring return which biases the actuator outwardly of the housing.

Housing 12 is preferably of a size and construction permitting it to be hand held. As will hereinafter be set forth, assembly 14 is made small enough to fit into housing 12 and is relatively lightweight in construction. Thus, apparatus 10 is suitable for field use wherein the user can easily carry it from place to place with no difficulty. To facilitate the portability of the apparatus, a portable power source 20, such as a battery or the like, is coupled by a connecting cable 22 to the housing for actuating the electrical power components associated with assembly 14. Power source 20 can be carried in any suitable manner along with apparatus 10. For use on a desk or other supporting surface, housing 12 is provided with a stand 24 depending from housing 12.

Assembly 14 includes a punch block 26 provided with a pair of sections 28 and 30 which are spaced apart to provide a tape passage 32 therebetween. For purposes of illustration only, sections 28 and 30 are held in fixed, spaced relationship by a pair of cross-shaped end members 34 and 36 coupled by fasteners 37 to sections 28 and 30. A first pair of support plates 38 and 40 span the distance between end members 34 and 36 and extend laterally from opposed sides of section 28 adjacent to the outer end face 42 thereof. Similarly, a second pair of support plates 44 and 46 span the distance between end members 34 and 36 and extend laterally from the opposed sides of section 30 adjacent to the outer end face 48 thereof.

Figure 2:
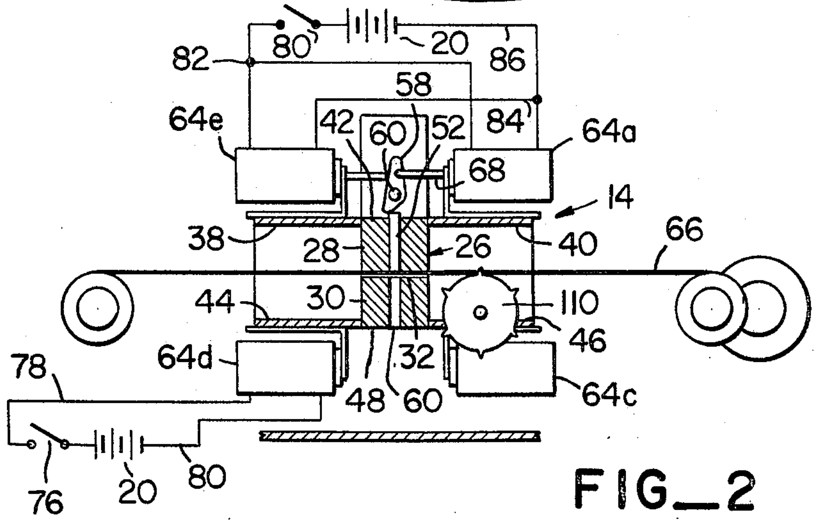
FIG. 2 is a vertical section through the novel punch block assembly of the apparatus.

Each of the sections 28 and 30 is provided with a plurality of bores 50 which extend through the section between the inner and outer faces thereof. Thus, bores 50 extend transversely of tape passage 32 as shown in FIG. 2. The bores of one section are aligned with corresponding bores of the other section.

Certain of the bores in section 28 have punch pins 52 shiftably mounted therein and the remaining bores of the other section are also provided with punch pins 52. Thus, there is only one punch pin for each pair of aligned bores in sections 28 and 30. Each punch pin will have a length slightly greater than the bore of the section in which it is disposed. Thus, the outer end portion 53 of the punch pin can project a short distance outwardly of the corresponding section as shown in FIG. 4.

The number of punch pins 52 and thereby the number of bores 50 will be determined by the information to be recorded on the tape. For purposes of illustration only, apparatus 10 will be described as constructed for use in recording numerical data in the binary system. Thus, there will be nine punch pins 52 and nine bores 50 in each section. Eight of the punch pins will be used for recording the numerical data and the ninth punch pin will be used for punching sprocket holes in the tape. The latter punch pin can be eliminated if the tape is initially provided with sprocket holes.

Figure 3:
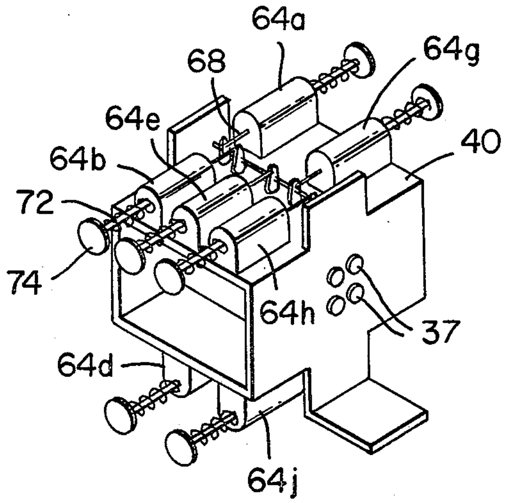
FIG. 3 is a perspective view of the punch block assembly.
Figure 4:
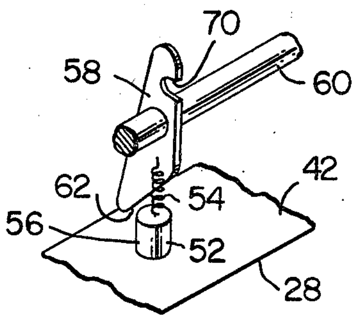
FIG. 4 is a perspective view of a punch pin in the punch block and the corresponding cam for moving the punch pin.

A spring 54 coupled to the outer end of each punch pin 52 biases the latter in a direction away from passage 32 so that end portion 56 of the pin will normally project outwardly from the corresponding section (FIG. 4). Spring 54 is also coupled with a cam 58 rotatably mounted on a shaft 60 spanning the distance between and coupled to end members 34 and 36 as shown in FIG. 3. Each punch pin 52 has a cam 58 and each cam has a cam surface 62 engageable with the corresponding end portion 56 to urge the punch pin into and through passage 32 when the cam is rotated in a counter-clockwise sense when viewing FIG. 4. When the cam is rotated in the opposite sense it clears its punch pin 52 and allows the latter to be retracted from passage 32. Cams 58 rotate independently of each other on the corresponding shafts 60, the latter being adjacent to and spaced outwardly from respective outer faces 42 and 48 in the manner shown in FIG. 2.

An electrical power device in the form of a solenoid 64 is provided for each punch pin 52 respectively. Each solenoid is coupled to a corresponding cam for rotating the same in the proper direction to advance the corresponding punch pin into and through passage 32. In this way, a perforable tape 66 extending through the passage will be punched to form a hole therein at a location aligned with the punch pin. Any suitable solenoid may be utilized for this purpose but, for purposes of illustration only, a solenoid of the type manufactured by Electromechanisms Incorporated of Temple City, Calif. have been found suitable for the purposes of the present invention. A solenoid of this type may be as small as .50 inch in length and may have a weight of one ounce or less. Thrust forces which can be realized with such a solenoid can be of the order of 10 to 20 ounces, a force suitable for rotating cams 58 to, in turn, advance the corresponding punch pins through a perforable tape in passage 32. Other power devices, of course, can be utilized if desired.

Each solenoid 64 is mounted on one of the support plates 38, 40, 44 or 46, depending upon the cams 58 which is to be rotated thereby. The solenoids are aligned with respective cams 58 and the cams and thereby the solenoids are staggered on opposed sides of the row of bores 50 to utilize the supporting area of support plates 38, 40, 44 and 46. FIGS. 2 and 3 illustrate the way in which the solenoids and cams are arranged about the punch pins to minimize the space requirements of assembly 14. For instance, solenoid 64*a* is disposed on support plate 40 and in alignment with the cam 58 corresponding to the endmost punch pin 52 adjacent to end member 34. Solenoid 64*b* is mounted on support plate 38 in alignment with the cam of the second punch pin adjacent to end member 34. Solenoid 64*c* is mounted on support plate 46 (FIG. 2) in alignment with the cam (not shown) corresponding to the punch pin in the third bore adjacent to end member 34. Solenoid 64*d* is mounted on support plate 44 and corresponds to the fourth punch pin position. Solenoid 64*e* is mounted on support plate 38 in alignment with the fifth punch pin position. The sixth solenoid is not shown but is secured to support plate 46 in alignment with the sixth punch pin posiiton. Solenoids 64*g*, 64*h*, and 64*j* are mounted as shown in FIG. 3 on support plates 40, 38 and 44, respectively, in alignment with the seventh, eighth and ninth punch pins, respectively.

Each solenoid has a push rod 68 coupled in any suitable manner to the corresponding cam 58 for rotating the same about the adjacent shaft 60. For purposes of illustration only, each cam 58 is provided with a recess 70 for receiving the proximal end of the push rod, the rod being normally attached to the cam.

Each solenoid further is provided with a core 72 which is biased by a spring 74 outwardly of the solenoid and is connected to the corresponding push rod. Thus, when the solenoid is energized, the core is drawn into the solenoid and the push rod is forced outwardly thereof and in a direction to rotate the corresponding cam to advance the respective punch pin into and through the tape passage 32. When the solenoid is de-energized, spring 74 returns core 72 to its normal position out of the solenoid.

The manner in which the solenoids are actuated is controlled by the way in which the aforesaid electrical switches are coupled thereto. For instance, it may be desirable to utilize the binary numbering system wherein one or more solenoids are energized simultaneously depending upon the number to be punched into the tape. For a single solenoid to be energized, it is coupled by a switch 76 to portable source 20 through the use of a pair of leads 78 and 80 (FIG. 2) where two or more solenoids are to be energized at the same time, a switch 82 couples a pair of the solenoids, for instance, solenoids 64*a* and 64*e* to power source 20 through the use of leads 82, 84 and 86. Thus, the punch pins will form holes in the tape 66 corresponding to whichever switch is actuated and the hole or holes punched in the tape and the relative positions of the holes will determine a particular number at the punched location on the tape. While the binary numbering system is especially adapted for use with apparatus 10, it is clear that other numbering systems can be utilized, if desired.

Means is provided to incrementally and intermittently advance tape 66 through passage 32 each time one of the switches is actuated. To this end, a feed reel 88 and a take up reel 90 are mounted in any suitable manner within housing 12 on opposed sides of punch block 26. Tape 66, which may be of paper or other suitable perforable material, is initially wound on reel 88 and is manually fed through passage 32 and onto reel 90. Any suitable means can be used to move the tape and reels simultaneously and through the same linear distances so that the tape will be fed off reel 88 and onto reel 90.

For purposes of illustration only, a stepping motor 92 is coupled by a gear train 94 to a take up clutch 96 coupled with reel 90. As the motor is energized, the gear train causes clutch 96 to rotate spool 90 in the direction of the arrow in FIG. 5.

Figure 6:
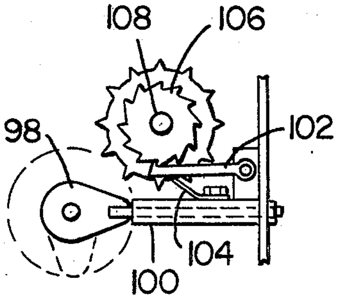
FIG. 6 is a side elevational view of a portion of the tape advancing means.
Figure 5:
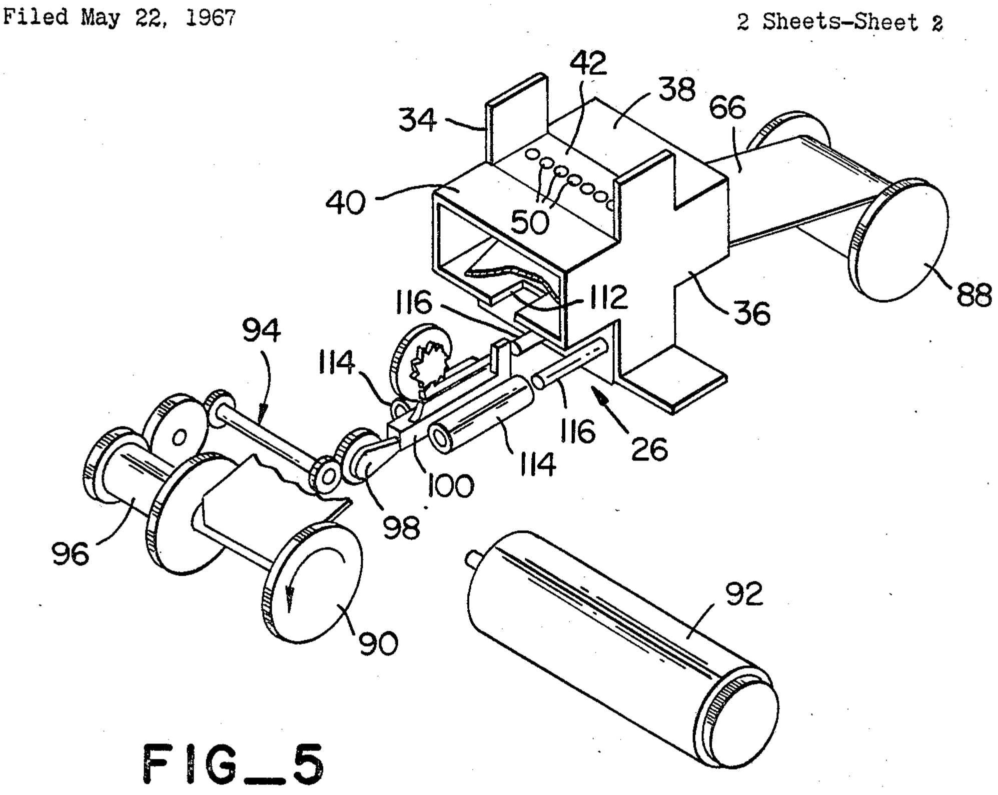
FIG. 5 is a perspective, partially exploded view of the punch block assembly, illustrating a perforable tape extending through the punch block and tape advancing means coupled with the tape, the tape being shown broken away to reveal details of construction.

Gear train 94 is also coupled to a cam 98 which engages a bar 100 in the manner shown in FIG. 6 to shift the bar and thereby a pawl 102 through a limited distance. A leaf spring 104 biases pawl 102 into engagement with a ratchet 106 carried by a shaft 108 mounted on the inner surface of support plate 46 in any suitable manner. A sprocket 110 is also mounted on shaft 108 and is rotated when ratchet 106 is rotated by the movement of pawl 102. Sprocket 110 has teeth which mesh with holes in tape 66. The tape can be prepunched or can be punched by one of the punch pins 52 to provide the sprocket holes. The spacing of the teeth on the sprocket will correspond to the spacing of the sprocket holes in tape 66. As shown in FIG. 5, support plate 46 is provided with a recess 112 to accommodate sprocket 110.

Bar 100 is provided with a pair of spaced sleeves 114 on opposed sides thereof (FIG. 5). Sleeves 114 are slidably mounted on pins 116 which project laterally from punch block 26. Thus, bar 100 is allowed to reciprocate under the action of cam 98. A suitable return spring (not shown) is provided to cause bar 100 to return to its initial position, whereby pawl 102 will again be in a position to rotate ratchet 106.

Operation

Housing 12 is provided with means (not shown) for allowing access to assembly 14 so that tape 66 can be put into place extending through tape passage 32 and coupled to sprocket 110 and take-up reel 90. When power source 20 is coupled by cable 22 to housing 12, the apparatus is ready for use.

In recording data, the user will press actuator 16 individually and in a sequence corresponding to the information to be punched into the tape. To punch numerical representations in the tape, certain of the push button switches will represent numbers 0 to 9 inclusive while other push button switches may represent codes, mathematical operations, such as multiplication and division, and other operational features. Thus, the tape, which will have a series of individual bit locations along its length, will be provided with holes therein which may not only represent numbers but codes and mathematical operations readable by suitable equipment, such as a computer network.

When a push button switch is actuated by forcing its actuator 16 inwardly of housing 12, the circuit to the solenoid or solenoids coupled with such switch is closed to energize the solenoid or solenoids. When this occurs, the corresponding cams are rotated by the push rods of the solenoids to, in turn, force the corresponding punch pins into and through tape passage 32. The tape will, thus, be punched at the locations of the pins. The number of the holes and their respective locations between the side edges of the tape will determine the value of the number and the particular code or mathematical operation that is associated with numerals or other information upstream or downstream of a particular location.

The user actuates the push button switches until the recording of the necessary data has been completed. The tape can then be removed from housing 12 and sent to a central control station either for storage or for providing an input to a computer network or the like. Alternately, the user can use the apparatus at various locations until the tape is completely punched, whereupon the tape can then be removed from the housing and replaced by an unused tape.

Each time a switch is actuated, the tape is advanced through a small distance by the rotation of sprocket 110 under the influence of motor 92. This will generally occur after the tape has been punched to avoid moving the tape with the punch pins still in the holes in the tape. To this end, the electrical circuitry of the apparatus can be devices to energize motor 92 after the push button actuator 16 of a particular switch has been returned or is being returned to its starting position.

Apparatus 10 provides a highly portable computer suitable for a wide variety of uses under different operating conditions. It can be constructed so that maintenance will be kept to a minimum to thereby minimize operating costs.

While one embodiment of this invention has been shown and described, it will be apparent that other adaptations and modifications can be made without departing from the true spirit and scope of the invention.

What is claimed is:

1. Tape punching apparatus comprising: a support having a number of electrical switches mounted thereon for actuation independently of each other; a punch pin assembly mounted on the support and having a tape-receiving passage and a row of punch pins mounted for movement transversely of and into and through said passage for perforating a tape therein; an actuatable, electrical power device for each punch pin respectively, certain of the power devices being mounted on one side of said passage and the remaining power devices being mounted on the opposite side of said passage; means coupling each power device to the corresponding punch pin to cause the latter to move into and through said tape passage when the power device is actuated; and means including an electrical power source for coupling said switches to said respective power devices, whereby the punch pins are selectively moved into and through said tape passage when the corresponding switches are actuated.

2. Apparatus as set forth in claim 1, wherein said support includes a housing, said assembly being disposed within the housing, said power source being externally of the housing.

3. Apparatus as set forth in claim 1, wherein said support includes a housing having a face, each switch having a push button actuator extending outwardly from said face and movable toward and away from the same, said assembly being disposed within the housing.

4. Apparatus as set forth in claim 1, wherein is provided means carried by said support and coupled with said switches for advancing a tape within the tape passage through an incremental distance each time a switch is actuated.

5. Apparatus as set forth in claim 1, wherein said assembly includes surface means for mounting said power devices adjacent to and aligned with respective punch pins.

6. Apparatus for punching a perforable tape comprising: a punch block having a tape passage therethrough and a row of bores extending transversely of and communicating with said tape passage; a punch pin for each bore respectively, the punch pins being shiftably mounted in respective bores for movement into and through said tape passage for perforating a tape therein; an actuatable power device for each punch pin respectively, each power device being aligned with and coupled to a respective punch pin for moving the latter into and through said tape passage when the power device is actuated; surface means secured to and extending laterally from said punch block on opposite sides of said bores for supporting said power devices; a support, said punch block being mounted on said support; and actuatable switch means carried by said support and being coupled with said power devices for selectively actuating the same, whereby a perforable tape can be punched by said punch pins.

7. Apparatus as set forth in claim 6, wherein said power devices are staggered relative to each other on opposite sides of said row to minimize the space utilized thereby.

8. Apparatus as set forth in claim 6, wherein is included a perforable tape extending through and being shiftable relative to said tape passage, and means coupled with said tape and carried by said support for incrementally advancing the tape each time said switch means is actuated.

9. A tape punch assembly comprising: a punch block having a tape passage therethrough and a plurality of pin-receiving bores extending thereinto, said bores being disposed in a row transversely of and communicating with said tape passage; a punch pin for each bore respectively, the punch pins being disposed within respective bores for movement relative thereto into and through said tape passage for perforating a tape therein; an actuatable power device for each punch pin respectively; surface means carried by said punch block for supporting said power devices on respectives sides of said row; and means coupling each power device respectively with the corresponding punch pin to cause the latter to move into and through said tape passage when the power device is actuated.

10. An assembly as set forth in claim 9, wherein each punch pin extends outwardly from said one extremity of the punch block, said coupling means including a cam rotatably mounted on said punch block, each power device including a solenoid having a core coupled with the respective cam, and wherein is included means biasing each pin in a direction away from said tape passage.

11. Tape punching apparatus comprising: a support having a number of electrical switches mounted thereon for actuation independently of each other; a punch pin assembly mounted on the support and having a tape-receiving passage and a row of punch pins mounted for movement transversely of and into and through said passage for perforating a tape therein, a number of punch pins being mounted on one side of the tape passage and the other punch pins being mounted on the opposite side of the tape passage with the punch pins on the opposed sides of the tape passage being staggered relative to each other; an actuatable, electrical power device for each punch pin respectively, each power device being on the same side of the tape passage as the corresponding punch pin, certain of the power devices being mounted on one side of said row and the remaining power devices being mounted on the opposite side of said row; means coupling each power device to the corresponding punch pin to cause the latter to move into and through said tape passage when the power device is actuated; and means including an electrical power source for coupling said switches to said respective power devices, whereby the punch pins are selectively moved into and through said tape passage when the corresponding switches are actuated.

12. Apparatus for punching a perforable tape comprising: a punch block having a tape passage therethrough and a number of bores extending transversely of and communicating with said tape passage; a punch pin for each bore respectively, the punch pins being shiftably mounted in respective bores for movement into and through said tape passage for perforating a tape therein, certain of the punch pins being on one side of said tape passage and the other punch pins being on the opposite side of said tape passage; an actuatable power device for each punch pin respectively, each power device being aligned with and coupled to a respective punch pin for moving the latter into and through said tape passage when the power device is actuated; a mounting structure for each side of said passage respectively, the mounting structure extending laterally from said punch block transversely of said bores, the power devices corresponding to the punch pins on opposed sides of said passage being secured to respective mounting structure; a support, said punch block being mounted on said support; and actuatable switch means carried by said support and being coupled with said power devices for selectively actuating the same, whereby a perforable tape can be punched by said punch pins.

13. Apparatus as set forth in claim 12, wherein said punch pins on one side of the tape passage are aligned in a row, said surface means including a pair of mounting structures on opposite sides of said row and on said one side of said tape passage, the power devices corresponding to said punch pins on said one side of the tape passage being secured to respective mounting structures.

14. Apparatus as set forth in claim 13, wherein said power devices on said mounting structures are staggered relative to each other.

15. A tape punch assembly comprising: a punch block having a tape passage therethrough, a pair of opposed, generally parallel outer faces, and a plurality of pin-receiving bores extending into the punch block from respective faces, said bores being disposed in a row transversely of and communicating with said tape passage; a punch pin for each bore respectively, the punch pins being disposed within respective bores for movement relative thereto into and through said tape passage for perforating a tape therein; an actuatable power device for each punch pin respectively; a pair of generally parallel supporting plates carried by said punch block adjacent to each outer face, respectively, and extending laterally therefrom in opposite directions, said power devices being supported on respective plates on respective sides of said row, the power devices on one of said plates being staggered relative to the power devices on the other plates; and means coupling each power device respectively with the corresponding punch pin to cause the latter to move into and through said tape passage when the power device is actuated.

16. A tape punch assembly comprising: a punch block having a tape passage therethrough and a row of pin-receiving bores disposed transversely of and communicating with said tape passage; a punch pin for each bore, respectively, the punch pins being disposed within respective bores for movement relative thereto into and through said tape passage; power structure for moving said punch pins, said structure including a number of power devices on one side of said tape passage and a group of power devices on the opposite side of the tape passage; and means for coupling each power device with a corresponding punch pin to cause the latter to move into and through said tape passage when the power device is actuated.

References Cited

UNITED STATES PATENTS

| | | | |
|---|---|---|---|
| 2,989,228 | 6/1961 | Glattli | 234—50 |
| 3,040,610 | 6/1962 | Svidercoschi | 234—108 X |
| 3,071,317 | 1/1963 | Mills | 234—123 X |
| 3,101,172 | 8/1963 | Mayer | 234—42 |
| 3,117,717 | 1/1964 | Draun et al. | 234—108 |
| 3,178,106 | 4/1965 | Jones | 234—108 |
| 3,372,865 | 3/1968 | Pellegrini | 234—108 X |

FOREIGN PATENTS

| | | |
|---|---|---|
| 526,365 | 6/1956 | Canada. |

WILLIAM S. LAWSON, Primary Examiner

U.S. Cl. X.R.

83—575; 234—123, 128